5 Sheets.

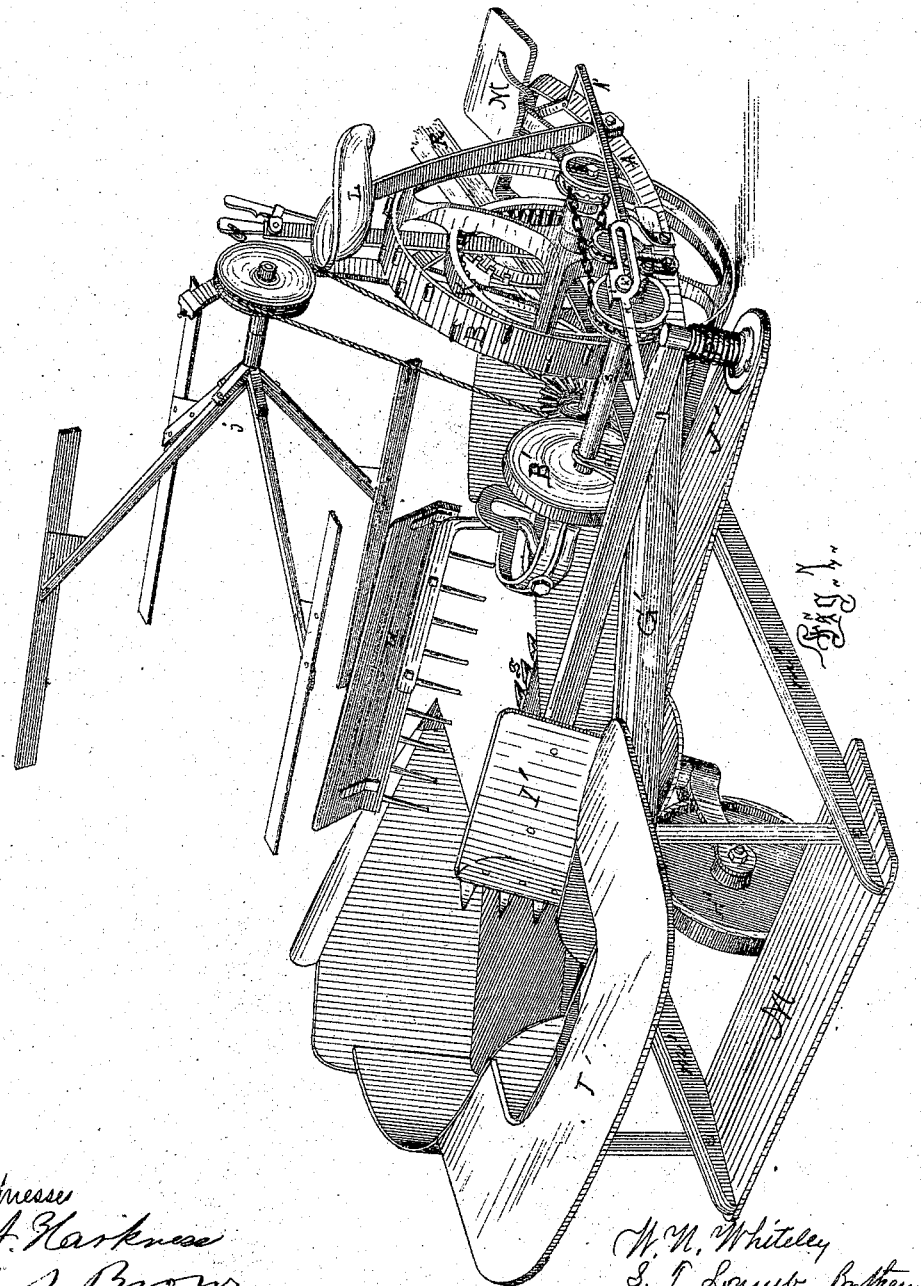

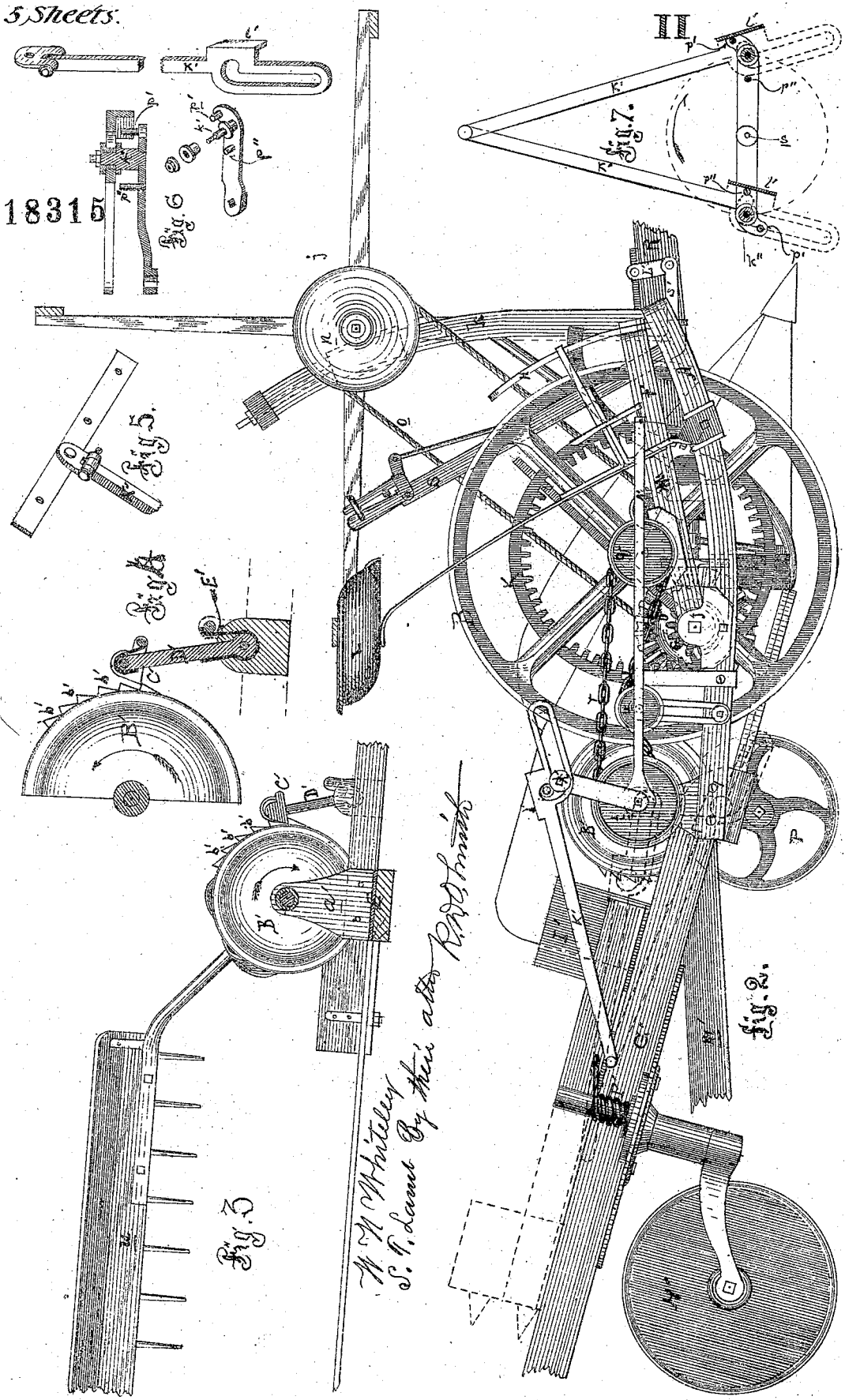

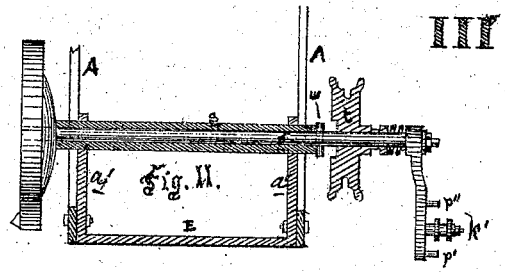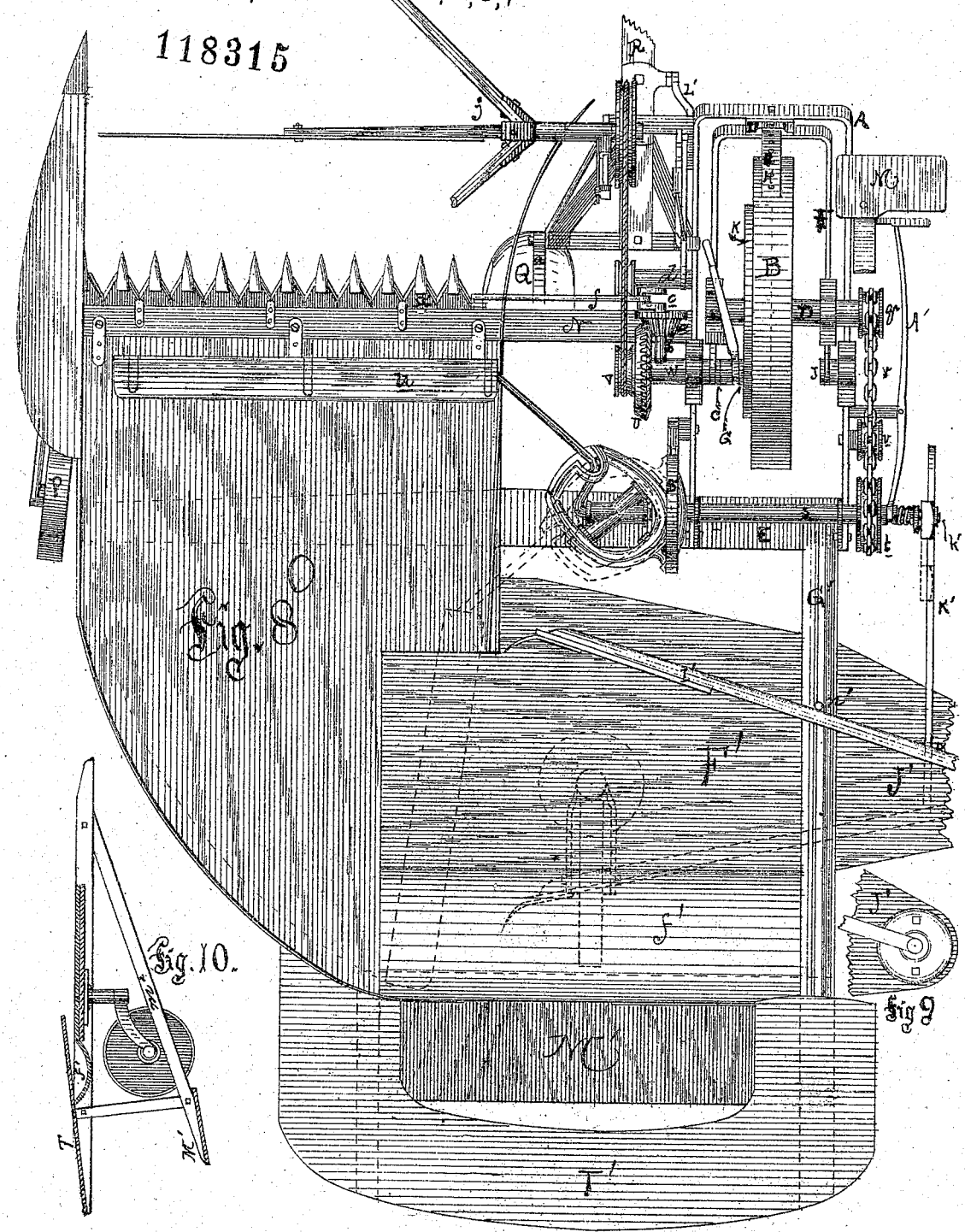

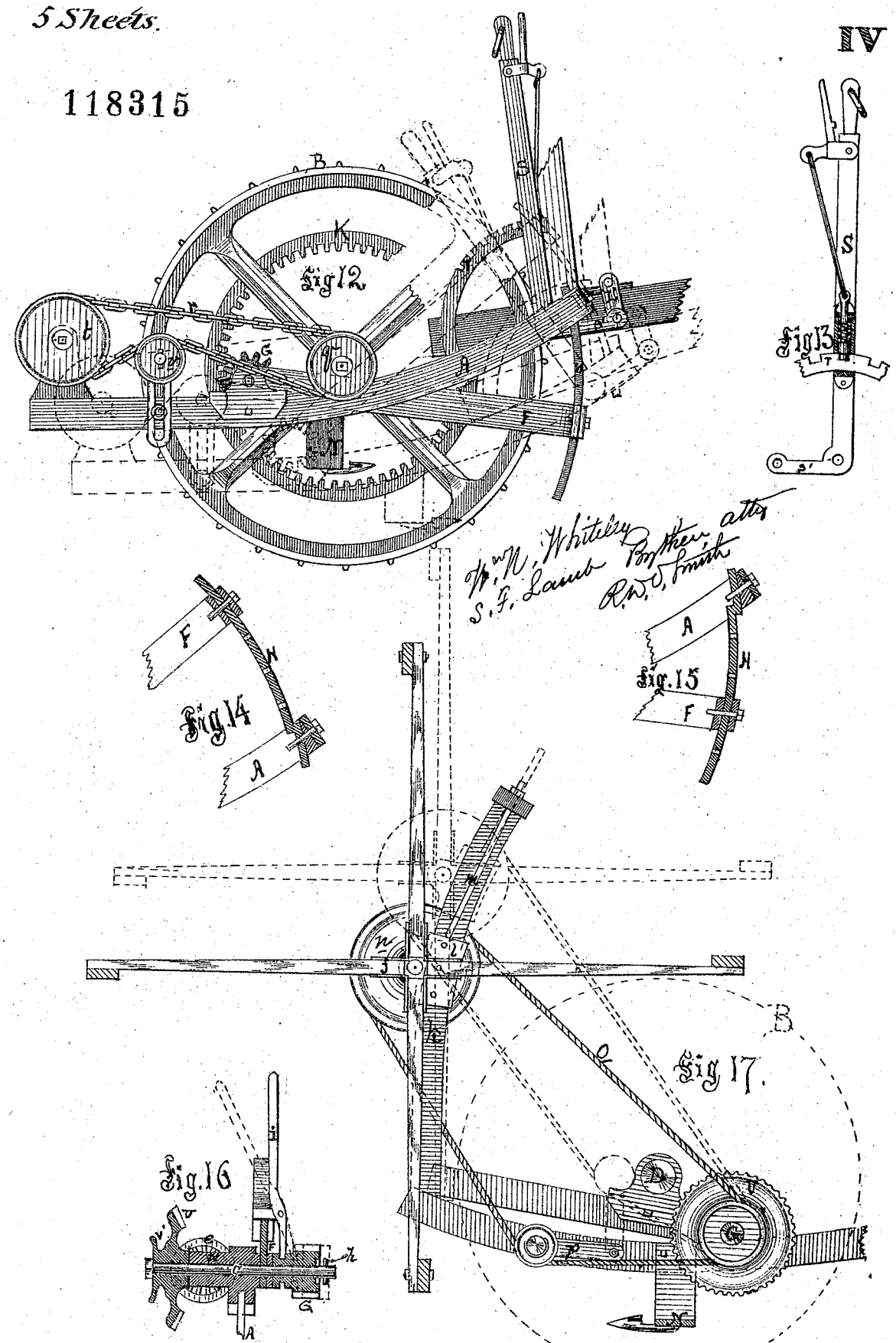

118315

118,315

UNITED STATES PATENT OFFICE.

WILLIAM N. WHITELEY AND SALEM T. LAMB, OF SPRINGFIELD, OHIO, ASSIGNORS TO SALEM T. LAMB.

IMPROVEMENT IN HARVESTERS.

Specification forming part of Letters Patent No. 118,315, dated August 22, 1871.

*To all whom it may concern:*

Be it known that we, WILLIAM N. WHITELEY and SALEM T. LAMB, of Springfield, in the county of Clark and State of Ohio, have invented a new and useful Improvement in Harvesters; and we do hereby declare the following to be a full, clear, and exact description of the same, reference being had to the accompanying drawing, in which—

Figure 18:
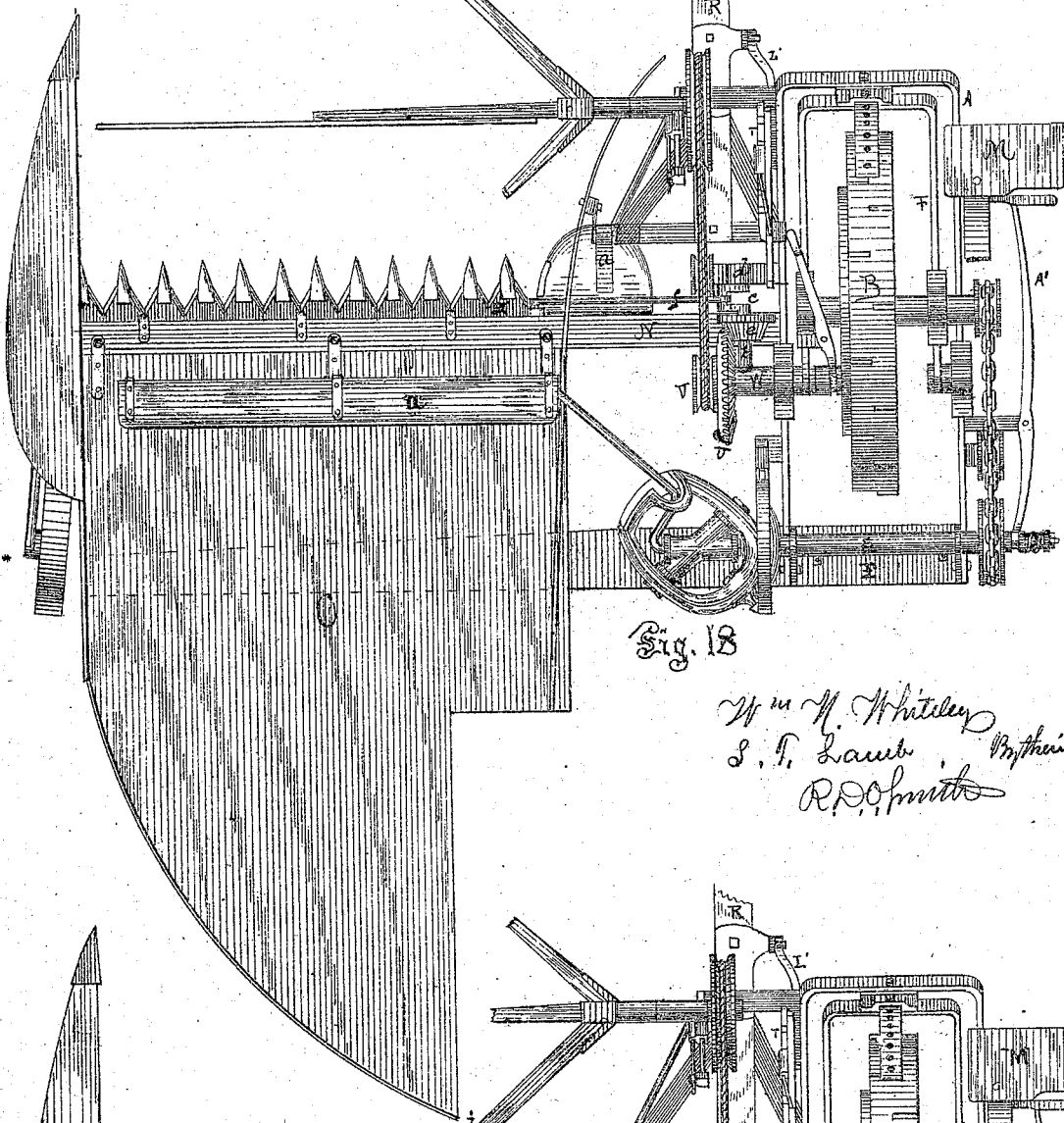
Figure 19:
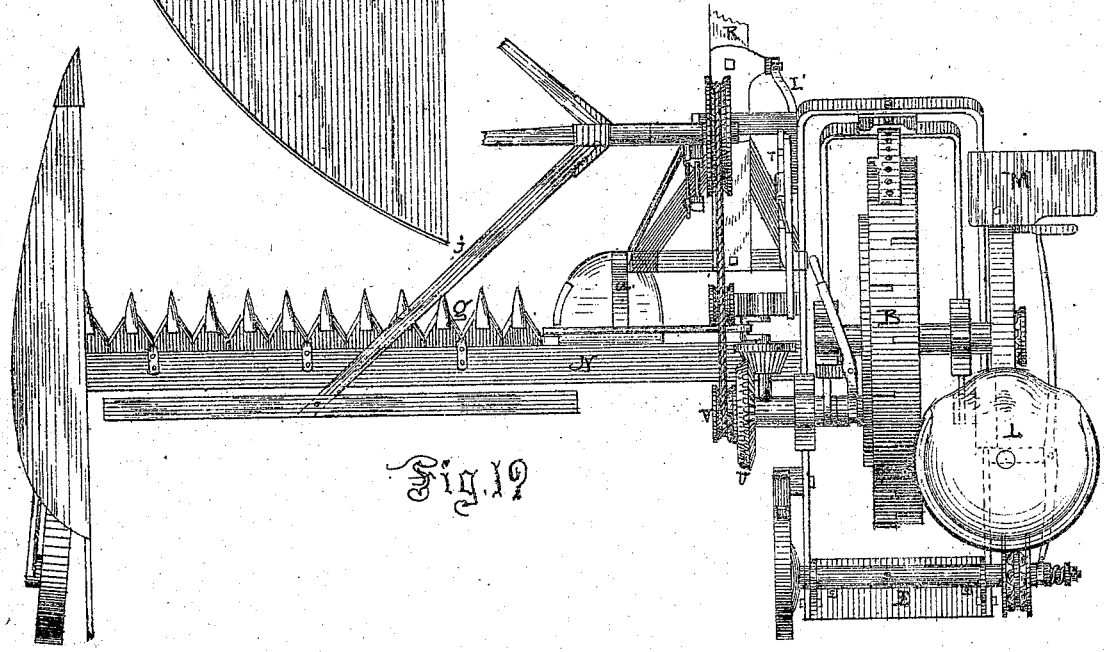

Figure 1 is a perspective view of our machine. Fig. 2 is an outer side elevation; Figs. 3 and 4, elevations, showing rake-detent; Figs. 5, 6, and 7, details of mechanism for driving supplemental rake; Figs. 8 and 9, plan of our machine; Fig. 10, vertical section of binder's stand, &c.; Fig. 11, longitudinal section of rake-driver's shaft and its mountings; Fig. 12, outer side elevation of portions of our machine, showing changes of elevation, &c.; Fig. 13, detail of elevating-lever; Figs. 14 and 15, detail of latch-segment for main and tongue-frames; Fig. 16, longitudinal section of boxings, &c., of main driving-pinion shaft; Fig. 17, side elevation of reel; Fig. 18, plan of machine arranged for side delivery; Fig. 19, plan of machine arranged for mowing.

This invention relates to that class of harvesters known as combined machines, and is intended to embrace three distinct purposes—i. e., first, mow grass; second, to reap grain and deliver the same in gavels upon the stubble at the side of the machine; third, to deliver the cut grain to binders riding upon the machine.

That others may fully understand its construction and combinations we will particularly describe the same.

The main frame A is formed of a single bar of wrought-iron, or its equivalent, extending around in front of the main driving-wheel B, and on either side of the same, and back to the transverse platform-bar E, to which its ends are secured. Within the main frame A the supplemental or segment-frame F is located. Said supplemental frame is constructed of a single bar, similarly to the main frame, and it is pivoted to said main frame at the axis of the main pinion-shaft C. The axle D of the main wheel B is mounted in boxes bolted to the said supplemental frame F. Said main frame may, therefore, be raised or lowered without changing the mesh of the main wheel and its pinion G. A perforated latch-segment, H, is secured permanently to the front of the main frame, and passes through a clip, I, bolted to the front end of the supplemental frame F, so that, by means of a key or pin, the supplemental frame may be locked to the main frame in any desired relative position, and the cutting apparatus is in that way maintained at the desired distance from the ground. The supplemental frame F is centered upon the pinion-shaft C at the inner side of the main wheel, and at the outer side it has bearings J bolted to the main frame in line with said pinion-shaft. An internal gear-wheel K is formed on the main wheel at its inner side, and the main pinion G meshes with said wheel and transmits motion to the operative mechanism of the machine. The driver's seat L is mounted upon a leg secured at its outer end to the outer side of the main frame A, and his foot-board M is supported upon an arm bolted to the seat-leg near its lower end. The finger-bar N is bolted at its inner end to the inner side of the main frame A, and carries the usual finger and cutters at its front edge and a quadrant-platform, O, at its rear edge. The outer end of the cutting apparatus, together with the platform and divider, is supported upon the adjustable caster grain-wheel P. At the inner end of the cutting apparatus the shoe Q is secured, and the tongue R is jointed to a lug, a, cast upon said shoe at one side and the main frame-bar at the other.

When the machine is in operation as a mower the cutting apparatus is lowered so as to slide upon the ground, and the tongue R is then liberated so as to be loosely jointed; but when the machine is operating as a reaper the cutting apparatus is raised up and maintained at the desired height upon the grain-wheels P at the outer end, and by connecting the main and supplemental frames at their front ends by means of the latch-segments H. When raised up into position for reaping, the cutting apparatus is nearly or quite in a vertical plane, cutting through the axis of the main wheel B; but when lowered to the ground for mowing, the cutters are considerably in advance of said plane, and the difference in relative position of the main frame A and supplemental frame F is then such that it is required to reverse the position of latch-segment H. The different positions of the main and supplemental frames are shown in Fig. 12, and the form, connection, and manner of reversing the latch-segment are illustrated in Figs. 14 and 15.

The tongue-joint is made controllable at the will of the driver, as is necessary when the machine is operating as a mower, by means of the hand latch-lever S, which is pivoted at its lower end to the inner side of the main frame, and works along a notched segment, T, with which said lever locks at any desired point, if the driver desires temporarily to alter the elevation of the cutters from the ground. The lever S is made with an angle-arm, $s'$, at its lower end, as shown in Fig. 13, and the extremity of said arm is connected with the tongue R by means of the link L'. The pinion-shaft C turns in a long box, W, bolted to the side bar of the main frame, and carries at its outer end a bevel-driver, U, and pulley-wheel V. The box W has an angle-arm, $b$, projecting from its side forward, and the end of said arm is bored out to form a bearing for the rear end of the cutter's crank-shaft $c$. The front end of said shaft is seated in an arm, $d$, bolted to the side of the main frame. The crank-shaft pinion $e$ meshes with the bevel-driver U, and through said crank-shaft and the pitman $f$ motion is communicated to the cutters $g$. By this arrangement the cutter's crank-shaft is reduced to the least possible length, and the driving mechanism to the utmost possible degree of compactness. The pinion G is movable upon the crank-shaft $c$ so as to engage with or disengage from the clutch-pin $h$, and it is moved into or out of said engagement by the clutch-lever $i$. (See Fig. 16.) The reel $j$ is mounted upon the post $k$, curved in the arc of a circle, having its center at or near the axis of the pinion-shaft C, and its box $l$ is supported and moved up and down along said post by the screw-rod $m$. (See Fig. 17.) The outer end of the reel-shaft is provided with a pulley-wheel, $n$. The belt $o$ passes over this pulley and the pulley V and drives the reel direct from the main pinion-shaft. A tightener, $p$, is provided to readily adjust the tension of the belt, when, from altering the position of the rake or any other cause, said tension is changed. At the outer end of the main shaft D there is a sprocket or chain-wheel, $q$, over which the chain $r$ passes to drive the rake-shaft $s$, a corresponding sprocket-wheel, $t$, being mounted upon the end of said shaft. An adjustable tightener and guide-wheel, $v$, is mounted upon the side of the main frame to keep the tension and line of the driving-chain $r$. The rake-shaft $s$ is mounted upon posts or studs $a'$ $a'$, which are set upon the platform-beam E at the rear end of the main frame. The rake $u$ is a reciprocating sweep-rake, and is operated by mechanism fully described in our patent dated July 12, 1870, to which reference is hereby made.

It will be observed that the raking mechanism is all driven by a chain-gearing arranged at the outer side of the driving-wheel. This method of driving the rake secures the following advantages: The rake-shaft can be made long, and therefore with steady and strong bearings. It can be located at any desired distance from the main axle and in any desired relative position without additional complication of parts, and the transmission of power will involve the least possible loss by friction. The sprocket-wheel $t$ is movable upon the rake-shaft $s$, so that it may be disengaged from a clutch-pin, $w$, (see Fig. 11,) to disengage and stop the rake, and this engagement or disengagement is effected at the will of the attendant by means of the clutch-lever A', which is located so as to be conveniently reached by his foot. When the rake is thrown out of gear it should be at a point just after it has begun to rise in its forward movement. It is advisable to provide a stop to arrest any backward movement of the rake when so thrown out of gear, and I therefore form upon the periphery of the driving-disk B' a limited number of ratchet-teeth, $b'$ $b'$, (see Figs. 3 and 4,) and a pawl or detent, $c'$, to engage with said teeth and arrest a backward movement of said disk and the rake $u$. The detent is actuated by a spring, and is mounted at the summit of a short arm, D'. It sometimes happens that the machine is moved suddenly backward when the rake is in gear, in consequence of inadvertence on the part of the attendant or restlessness of the team, and in such an event, if the detent C' should be unyielding to the said backward movement of the rake, some part of the mechanism would be broken. I therefore pivot the arm D' at its lower end and hold it in position by means of a strong spring, E', which will only yield when the stress is so great as to endanger the mechanism. Under such circumstances the rake will be permitted to revolve backward, and the apparatus will not be broken. I have now described so much of my machine as is required either in mowing grass or in reaping grain, with an ordinary side delivery.

To arrange my machine for mowing grass, the platform O is removed, as shown in Fig. 19, and the cutting apparatus is lowered to the ground, as shown in Fig. 12. When employed to deliver the grain at the side, in the ordinary way of a side delivery, the machine is as represented in Fig. 18; but when the gavels are to be delivered to binders riding upon the machine, a supplementary platform and rake is attached, carrying a foot-board and table for the attendant binders. These attachments will now be described. The supplemental platform F' is nearly or quite rectangular in shape, and is secured to the frame of the machine by beams, one of which, G', is shown in Figs. 1 and 8; the other runs under and is concealed by the platform O. These beams are firmly bolted to the platform-beam E. Beneath the central portions of the platform F' is a bearing caster-wheel H'. The gavel is removed from the platform O and deposited upon the platform F' by the rake $u$ in the usual manner, which is well understood. The supplemental rake I' then removes the gavel to a curved receptacle, $f'$, (see Fig. 10,) at the rear of the platform F', from whence it is taken by the attendant binders, as required. The rake I' is an intermittent reciprocating sweep-rake, with its center of motion located at the extremity of a lateral extension, J', of the platform F', as shown in Figs. 1 and 8. The rake I' is moved by a slotted pitman, K', and takes motion from a crank at the end of the rake-shaft $s$, (see Figs. 5, 6, 7;) it therefore moves in accord with the rake $u$. The pitman K′ has an L-slot at its forward end in which the crank-pin $k'$ plays, and at each revolution of said crank-pin the rake I′ is reciprocated, with this peculiarity of motion, however, i. e., its motion forward and backward is continuous, and is made while the crank-pin is traversing the up-half of its revolution, as shown in Fig. 7. When the crank-pin $k'$ is at its lowest point, $k''$, Fig. 7, it is then at the L-end of the pitman-slot, and its further movement pushes the pitman and rake before it. During the up quarter-stroke from the point $k''$ it makes its forward stroke, as shown by dotted lines in Fig. 8, and if the pitman-slot were a plain slot and the rake were not provided with reacting contrivances, the rake would only make its return-stroke after the crank-pin had traversed the length of the slot and engaged with the other or outer end thereof. As the crank-pin passes its point of greatest forward extension and thence completes its upward stroke, the rake I′ is drawn backward, because the crank-pin then engages in the L of the slot. As the crank-pin completes the half-stroke from the point $k''$, the pitman is lifted so as to disengage the L from the crank-pin, and the rake remains at rest until the completion of the remaining half-stroke of the crank-pin—i. e., its return to the point $k''$. The pitman $k'$ is lifted to disengage the L-slot and crank-pin by means of a plate or flange, $l'$, (see Fig. 6,) placed on said pitman and projecting over the crank, and a pin, $p'$, set in the crank a little distance above the crank-pin $k'$. The distance between the extremity of the L-slot and the flange $l'$ is less than the distance from the pin $p'$ and the wrist-pin $k'$. The pin $p'$ therefore engages with the flange $l'$ before the crank has reached the highest point of its stroke, and the pitman is lifted by said pin far enough to cause the crank-pin to slip out of the L of the pitman-slot. A pin, $p''$, set also in the crank, but below the wrist-pin, engages with the plate $l'$, and sustains the pitman until the first quarter-stroke from $k''$ is nearly completed, and the crank-pin, therefore, does not pass into the L of the pitman-slot until the completion of the first half of the up-stroke. When the rake is moved backward by a retrograde movement of the machine, the pin $p''$ lifts the pitman so as to release the crank-pin from the L of the slot in the same manner as the pitman is lifted by the pin $p'$. A spring, P′, may be employed if from any cause the wrist-pin and L-slot fail to operate satisfactorily, as described.

The construction of the wrist-pin $k'$ with hardened friction-thimble is shown in Fig. 6.

A stop-pin, $n'$, arrests the rake at the proper point and prevents it from moving too far forward from any cause, accidental or otherwise.

The binder's stand or foot-board M′ is suspended from the rear edge of the platform F′, and is supported by braces $m'$. The binder's table T′ extends at either end and behind the foot-board M′, as shown in Fig. 8.

Having described our invention, what we claim as new is—

1. The reversible latch-segment H, in combination with frames A, F, as set forth.

2. In combination with the wheel B′, provided with ratchet-teeth, the detent C′ mounted upon a yielding arm, D′, substantially as set forth.

3. The combination of the rakes $u$ and I′ and shaft S with the cranks B′ and $t$ and pitman K′, arranged as described.

4. In combination with the rake I′ and crank-pin $k'$, the slotted pitman K′, flange-plate $l'$, and pins $p'$ $p''$, as and for the purpose set forth.

5. In combination with the rake I′, crank $k'$, and slotted pitman K′, the spring P′, as and for the purpose set forth.

WILLIAM N. WHITELEY.
SALEM T. LAMB.

Witnesses:
JEROME FASSLER,
WILLIAM T. STILWELL.